United States Patent
Eiletz et al.

(10) Patent No.: US 12,391,106 B2
(45) Date of Patent: Aug. 19, 2025

(54) MODULAR MOTOR VEHICLE ARCHITECTURE

(71) Applicant: Bayerische Motoren Werke Aktiengesellschaft, Munich (DE)

(72) Inventors: Richard Eiletz, Deisenhofen (DE); Alexander-Wilhelm Otte, Egenhofen (DE); Christoph Warkotsch, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 429 days.

(21) Appl. No.: 17/790,313

(22) PCT Filed: Dec. 17, 2020

(86) PCT No.: PCT/EP2020/086876
§ 371 (c)(1),
(2) Date: Jun. 30, 2022

(87) PCT Pub. No.: WO2021/148209
PCT Pub. Date: Jul. 29, 2021

(65) Prior Publication Data
US 2023/0039653 A1 Feb. 9, 2023
US 2025/0178422 A2 Jun. 5, 2025

(30) Foreign Application Priority Data
Jan. 20, 2020 (DE) .................... 10 2020 101 154.7

(51) Int. Cl.
*B60K 1/04* (2019.01)
*B60K 15/07* (2006.01)
*B60K 15/063* (2006.01)

(52) U.S. Cl.
CPC ............... *B60K 1/04* (2013.01); *B60K 15/07* (2013.01); *B60K 2001/0438* (2013.01); *B60K 2015/0634* (2013.01)

(58) Field of Classification Search
CPC .. B60K 1/04; B60K 15/07; B60K 2001/0438; B60K 2015/0634
See application file for complete search history.

(56) References Cited

U.S. PATENT DOCUMENTS 10,792,992 B2 * 10/2020 DeLizo .................... B60K 6/24
11,225,151 B2 *  1/2022 Enning ................... B60L 50/66
(Continued)

FOREIGN PATENT DOCUMENTS

| CN | 103241112 A | 8/2013 |
|---|---|---|
| CN | 103303374 A | 9/2013 |

(Continued)

OTHER PUBLICATIONS

International Search Report (PCT/ISA/210) issued in PCT Application No. PCT/EP2020/086876 dated Mar. 9, 2021 with English translation (five (5) pages).

(Continued)

*Primary Examiner* — Bryan A Evans
(74) *Attorney, Agent, or Firm* — Crowell & Moring LLP

(57) ABSTRACT

A modular motor vehicle architecture is provided for motor vehicles of different motor vehicle types, in each case having at least one drive machine and at least one energy storage unit paired with the at least one drive machine. The at least one energy storage unit is received in a modularly designed underfloor energy storage unit assembly that has a plurality of energy storage unit modules, at least one outer dimension of which is standardized. Each vehicle type is paired with one underfloor energy storage unit assembly from a plurality of standardized underfloor energy storage unit assemblies.

(Continued)

And, each underfloor energy storage unit assembly has a plurality of unit module installation areas, a longitudinal dimension of which extending in the longitudinal direction of the motor vehicle is standardized and each of which is designed to receive at least one respective standardized energy storage unit module.

13 Claims, 7 Drawing Sheets

(56) References Cited

U.S. PATENT DOCUMENTS

| | | | |
|---|---|---|---|
| 2003/0070850 A1* | 4/2003 | Reid | H01M 8/0491 180/68.5 |
| 2016/0006008 A1 | 1/2016 | Volz | |
| 2018/0056769 A1 | 3/2018 | Kerspe et al. | |
| 2018/0186227 A1 | 7/2018 | Stephens et al. | |

FOREIGN PATENT DOCUMENTS

| | | | |
|---|---|---|---|
| CN | 110293832 A | | 10/2019 |
| DE | 102008061757 A1 * | 6/2010 | ............... B60K 1/00 |
| DE | 10 2013 204 765 A1 | | 9/2014 |
| DE | 10 2014 018 343 A1 | | 6/2016 |
| DE | 10 2016 007 124 A1 | | 2/2017 |
| DE | 10 2017 117 726 A1 | | 2/2019 |
| EP | 2 463 162 A2 | | 6/2012 |
| JP | 2019-89376 A | | 6/2019 |

OTHER PUBLICATIONS

German-language Written Opinion (PCT/ISA/237) issued in PCT Application No. PCT/EP2020/086876 dated Mar. 9, 2021 (six (6) pages).

German-language Search Report issued in German Application No. 10 2020 101 154.7 dated Oct. 13, 2020 with partial English translation (12 pages).

English translation of Chinese-language Office Action issued in Chinese Application No. 202080081880.3 dated Mar. 7, 2025 (10 pages).

English translation of Chinese-language Office Action issued in Chinese Application No. 202080081880.3 dated Jun. 13, 2025 (11 pages).

* cited by examiner

MODULAR MOTOR VEHICLE ARCHITECTURE

TECHNICAL FIELD

The invention relates to a modular motor vehicle architecture for motor vehicles of different motor vehicle types with in each case at least one drive unit and at least one energy store which is assigned to the at least one drive unit and is received in an underfloor energy store assembly of modular construction. Furthermore, the invention relates to a motor vehicle with a modular motor vehicle architecture of this type with an underfloor energy store assembly of modular construction.

BACKGROUND AND SUMMARY

Known electric vehicles have what is known as a traction battery which serves to store electric energy for an electric drive of the electric vehicle. A traction battery of this type forms a battery assembly which has battery modules which are in turn constructed from battery cells. The battery modules are accommodated in a housing which serves to protect the battery modules and therefore also the battery cells and which also contains apparatuses for thermal management and control of the battery cells. For example, a battery assembly of this type is arranged with a housing in a floor region of a motor vehicle between the front and rear axle of the motor vehicle as an underfloor battery.

Battery electric vehicles (BEV) are commonly provided with underfloor battery arrangements of this type. An arrangement of this type of the battery modules ensures a low center of gravity of the vehicle which is generally desired with regard to the driving behavior. Furthermore, the underfloor arrangement makes uncomplicated access to the battery modules and even a rapid replacement of the battery modules in the case of repairs or service possible. The battery modules which are composed of a multiplicity of battery cells are conventionally adapted to the underfloor architecture of the respective vehicle. This design approach is complex, in particular if a vehicle type has a plurality of vehicle derivatives, that is to say is offered in a plurality of drive variants (BEV, internal combustion engine vehicles, hybrid vehicles, fuel cell vehicles) which require different energy stores, and is offered in a plurality of vehicle body variants with, for example, different vehicle heights, different wheelbases and different wheel diameters (short/long limousine, coupe, cabriolet, station wagon, SUV, sports car, etc.) which have different space conditions for an underfloor arrangement of energy stores.

DE 10 2013 204 765 A1 describes a storage cell unit for storing electric energy for driving an electric motor of a motor vehicle. The housing is connected from below to a left-hand side sill and a right-hand side sill. In the case of a side-on collision, collision energy is dissipated by way of deformation of the relevant side sill and an adjoining side sill of the housing of the storage cell unit. In order to protect the storage cells which are accommodated in the housing, associated deformation zones are configured adjacently with respect to the side walls of the housing, as a result of which the storage cells are arranged in a central region of the housing. Intermediate walls which run in the vehicle longitudinal direction and vehicle transverse direction are provided in order to reinforce the housing.

It is an object of the present invention to provide a modular motor vehicle architecture for motor vehicles of different motor vehicle types, by way of which modular motor vehicle architecture it is possible to reduce the costs of development and production of a multiplicity of different motor vehicle types and to simplify the production thereof. It is a further part of the object to specify a motor vehicle with a modular motor vehicle architecture of this type.

That part of the object which is directed to the modular motor vehicle architecture is achieved by way of the independent claim.

A modular motor vehicle architecture according to the invention is provided for motor vehicles of different motor vehicle types with in each case at least one drive unit and at least one energy store which is assigned to the at least one drive unit, the at least one energy store being received in an underfloor energy store assembly of modular construction which has a plurality of energy store modules which are standardized in terms of at least one external dimension, each vehicle type being assigned an underfloor energy store assembly consisting of a plurality of standardized underfloor energy store assemblies, and the respective underfloor energy store assembly having a plurality of uniform module installation spaces which are standardized in terms of a longitudinal dimension which runs in the longitudinal direction of the motor vehicle, and which are configured to receive in each case at least one standardized energy store module.

The term "standardized energy store modules" denotes, in particular, geometrically uniform energy store modules.

The use of underfloor energy store assemblies which are standardized at least in terms of their internal construction with uniform module installation spaces which are provided in their respective interior and are configured for receiving energy store modules which are for their part again standardized permits standardized mass production of identical standardized energy store modules for different vehicle types. The standardization of the underfloor energy store assemblies at least with regard to their internal architecture, that is to say their internal construction, with the likewise standardized uniform module installation spaces also not only makes a high degree of common part manufacture possible, but rather also more efficient production, since those dimensions of the components which are relevant for robot assembly, for example of the shaped parts which have the uniform module installation spaces, are identical for different vehicle types.

It is advantageous here from the viewpoint of the designer that there is a high proportion of uniform structures across all vehicle types and vehicle derivatives within the vehicle architecture as a result of the use of standardized components.

Further preferred and advantageous design features of the modular motor vehicle architecture according to the invention are the subject matter of the dependent claims.

A plurality of standardized uniform module installation regions which lie behind one another are provided in the underfloor energy store assembly in the longitudinal direction of the motor vehicle.

It is advantageous here if the longitudinal dimension, running in the longitudinal direction of the motor vehicle, of each standardized uniform module installation area corresponds to the longitudinal dimension of the standardized uniform module installation space.

In one advantageous development, the underfloor energy store assembly has a further uniform module installation region with at least one shortened uniform module installation space, the longitudinal dimension, running in the longitudinal direction of the motor vehicle, of the further uniform module installation region and the longitudinal dimension, running in the longitudinal direction of the motor vehicle, of the shortened uniform module installation space are shorter than those of a regular standardized uniform module installation region and a regular standardized uniform module installation space, respectively. As a result of the provision of a shortened uniform module installation region of this type, the remaining space between the axles can still be utilized for the installation of additional shortened energy stores or their peripheral components in the case of vehicles, in the case of which the wheelbase does not permit the provision of a whole multiple of the standardized uniform module installation spaces.

One preferred development provides that a middle channel which runs in the longitudinal direction of the motor vehicle is provided which divides the respective uniform module installation space region into a left-hand and a right-hand uniform module installation space. This channel can be utilized, for example, for accommodating electric lines, fuel lines or other peripheral components, and it divides the respective uniform module installation space region into a left-hand and a right-hand uniform module installation space.

At least one energy store module is formed by at least one electric battery module or has at least one electric battery module.

In addition, at least one energy store peripheral unit is preferably provided which is configured for receiving in a uniform module installation space and has the electric control and/or regulating devices for the electric battery modules. In the case of a battery electric vehicle, the standardized energy store modules are, for example, the battery modules and also battery peripheral components such as, for example, control units or contactors. These battery peripheral components orient themselves in terms of their external dimensions to the form factor which is predefined by way of the standardized energy store modules; they are as a rule smaller than or as large as the standardized energy store modules. In particular, their height and their extent in the vehicle longitudinal direction are of identical magnitude to those of the standardized energy store modules.

As an alternative or in addition, at least one energy store module is formed by at least one liquid fuel tank or has at least one liquid fuel tank.

It is advantageous here if at least one energy store peripheral unit is provided which is configured for receiving in a uniform module installation space and has the control and/or regulating devices for the liquid fuel.

As an alternative or in addition, furthermore, at least one energy store module is formed by at least one pressure tank for a gaseous fuel or has at least one pressure tank of this type.

Also in the case of this variant, it is advantageous if at least one energy store peripheral unit is provided which is configured for reception in a uniform module installation space and has the control and/or regulating devices for the gaseous fuel.

That part of the object which is directed to the motor vehicle is achieved by way of a motor vehicle according to the independent claim, having a modular motor vehicle architecture with a modular underfloor energy store assembly.

In the case of a motor vehicle of this type with a modular motor vehicle architecture with a modular underfloor energy store assembly, the modular underfloor energy store assembly preferably has three or more uniform module installation space regions in the longitudinal direction of the motor vehicle.

A motor vehicle with a modular motor vehicle architecture with a modular underfloor energy store assembly is also particularly advantageous, in the case of which motor vehicle at least one uniform module installation space is configured as footwell recess in at least one of the uniform module installation space regions. This variant is advantageous, in particular, in the case of low vehicles. Here, the uniform module installation space can be open toward the top and can receive a recessed interior compartment floor region, or the upper covering of the underfloor energy store assembly can be recessed in the region of this uniform module installation space.

The fundamental idea of the inventive concept for a modular motor vehicle architecture therefore consists in a use across different motor vehicle types and vehicle classes of standardized uniform module installation spaces for receiving standardized energy store modules for a motor vehicle family, for example across at least two vehicle classes.

The different vehicle derivatives within the vehicle family differ, depending on the vehicle concept, as follows, for example:

High vehicles (for example, SUVs or big sedans/station wagons) have a continuous underfloor energy store assembly with four uniform module installation space regions ("module rows"); the at least one energy store peripheral unit is arranged above the fourth, rearmost module row.

Low and aerodynamically favorable vehicles (for example, coupes) likewise have four module rows, the third (that is to say, the penultimate) module row being configured with footwell recesses for the rear seat passengers; the energy store modules are therefore omitted in the third of four module rows, and the at least one energy store peripheral unit is also arranged here above the fourth, rearmost module row.

Space-functional vehicles have a continuous underfloor energy store assembly with four uniform module installation space regions ("module rows"); the at least one energy store peripheral unit is arranged behind the fourth, rearmost module row; there is therefore the option of providing a flat interior compartment floor as far as the rear part of the vehicle.

Highly sporty, two-seat vehicles have a continuous underfloor energy store assembly in the case of a shortened wheelbase with only three uniform module installation space regions ("module rows"); the at least one energy store peripheral unit is arranged above the third module row.

In the case of the plug-in hybrid vehicle (PHEV), battery electric vehicle with range extender (BEVx) and fuel cell vehicle (FCEV) drive types, partial fitting of the uniform module installation spaces with from two to four energy store modules which are configured as a high voltage battery (corresponds to from one to two module rows) takes place for the high voltage energy store. At least one fuel tank (in the case of PHEV and BEVx) or transversely arranged hydrogen tanks (in the case of FCEV) is/are installed into the remaining uniform module installation spaces.

The essential advantages of the invention are a design of the vehicles of a vehicle product family, which design is minimized in terms of complexity and is therefore optimum in terms of costs, and a reduced protection complexity as a result of standardized energy store modules and as a result of a high proportion of uniform structures across all vehicle derivatives.

Preferred exemplary embodiments of the invention with additional design details and further advantages are described and explained in greater detail in the following text with reference to the appended drawing.

DETAILED DESCRIPTION OF THE DRAWINGS

Figure 1:
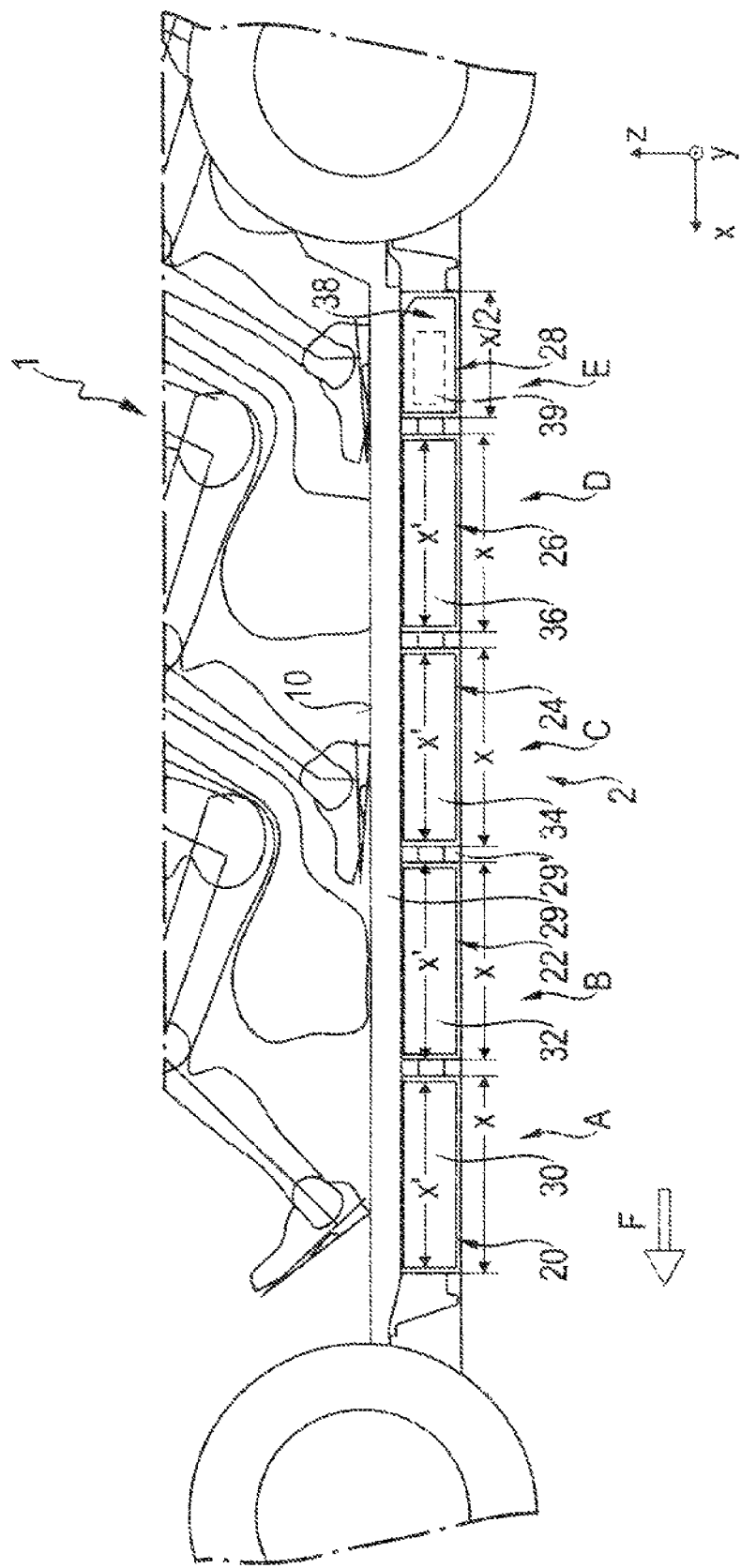
FIG. 1 shows a diagrammatic longitudinal section through a first variant of an underfloor energy store assembly of modular construction of a modular motor vehicle architecture according to the invention.

FIG. 1 shows a diagrammatic longitudinal section through a first variant of an underfloor energy store assembly 2 of modular construction in a motor vehicle 1 which is shown merely in details and diagrammatically and is equipped with a modular motor vehicle architecture according to the invention.

The underfloor energy store assembly 2 is provided with a plurality of uniform module installation spaces 20, 22, 24, 26, 28 which are arranged behind one another in the longitudinal direction X of the motor vehicle 1 and in which, in each case, at least one standardized energy store module 30, 32, 34, 36 of an energy store 3 is arranged. The front (in the traveling direction F) uniform module installation spaces 20, 22, 24, 26 are standardized in terms of their longitudinal dimension x which runs in the longitudinal direction X of the motor vehicle 1, and are therefore of equal length. The rearmost uniform module installation space 28 is only half as long as the standardized uniform module installation spaces 20, 22, 24, 26, and therefore has merely a longitudinal dimension of ½ x. All uniform module installation spaces are identical in terms of height, with the result that the upper covering 29 of the underfloor energy store assembly 2 forms a planar interior compartment floor 10 of the motor vehicle 1 in the example which is shown in FIG. 1. The underfloor energy store assembly is provided with a lower floor 29' on the underside.

The energy store modules 30, 32, 34, 36 are likewise of identical configuration in terms of their longitudinal dimension x' which extends in the longitudinal direction X of the motor vehicle 1, and are therefore also standardized. Here, the length x' of the energy store modules are slightly smaller than the interior compartment length, that is to say the longitudinal dimension x of the uniform module installation spaces, with the result that an energy store module 30, 32, 34, 36 can be inserted with an accurate fit in a longitudinal direction into an associated uniform module installation space 20, 22, 24, 26.

An energy store peripheral unit 38 which has the control and/or regulating devices 39 (shown merely diagrammatically in FIG. 1) for the energy store modules 30, 32, 34, 36 is inserted into the last uniform module installation space 28 which is half as long.

Figure 2:
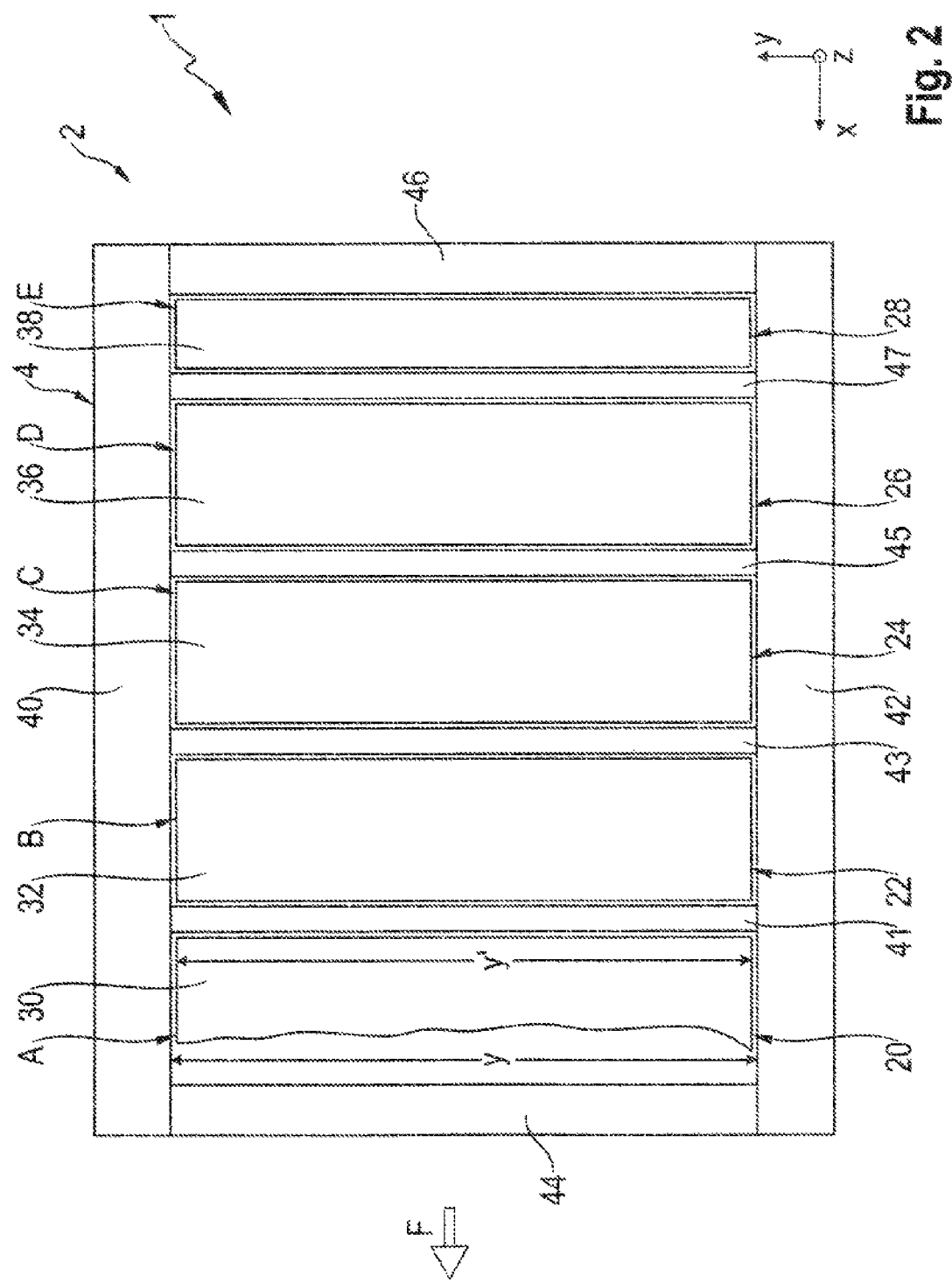
FIG. 2 shows a diagrammatic outline of an underfloor energy store assembly of modular construction of a modular motor vehicle architecture according to the invention.

FIG. 2 shows a top view of the underfloor energy store assembly 2 of the motor vehicle 1 in a diagrammatic illustration in outline, the covering 29 having been omitted. A peripheral protective frame 4 forms a safety housing of the underfloor energy store assembly 2.

The peripheral protective frame 4 is provided with lateral longitudinal beams 40, 42 and a front and a rear crossmember arrangement 44, 46. With the lower floor 29', the protective frame 4 forms a load-bearing structure for the standardized energy store modules 30, 32, 34, 36, received in the uniform module installation spaces 20, 22, 24, 26, 28, and the at least one energy store peripheral unit 38. Inner cross members 41, 43, 45, 47 extend between the right-hand lateral longitudinal beam 40 and the left-hand lateral longitudinal beam 42. The inner cross members 41, 43, 45, 47 serve firstly to reinforce the protective frame 4 in the transverse direction (Y-direction), and they are secondly also provided to support and to secure interior compartment fittings of the motor vehicle 1 such as, for example, vehicle seats. The spacing between crossmembers which are adjacent with respect to one another in the longitudinal direction X of the motor vehicle 1 corresponds in each case to the longitudinal dimension x of a standardized uniform module installation space 22, 24, 26 or (not shown) a whole multiple of the longitudinal dimension x. In this way, the standardized uniform module installation spaces 20, 22, 24, 26 are formed between the front crossmember arrangement 42 and the frontmost inner crossmember 41 and between the inner cross members 41, 43, 45, 47. The rear, half uniform module installation space 28 lies between the rearmost inner crossmember 47 and the rear crossmember arrangement 46. All the uniform module installation spaces 20, 22, 24, 26, 28 extend, in their width y in the vehicle transverse direction Y, over the entire width between the lateral longitudinal beams 40, 42.

The width y' of the standardized energy store modules 30, 32, 34, 36 which are received in the standardized uniform module installation spaces 20, 22, 24, 26 is slightly shorter than the width y of the uniform module installation spaces 20, 22, 24, 26, with the result that the standardized energy store modules 30, 32, 34, 36 can be inserted with an accurate fit into the standardized uniform module installation spaces 20, 22, 24, 26. In the example which is shown, the energy store peripheral unit 38 also extends over the entire width of the rearmost uniform module installation space 28.

The underfloor energy store assembly 2 which is shown in FIG. 2 therefore has five uniform module installation space regions A, B, C, D, E, of which the front uniform module installation space regions A, B, C, D in each case comprise a standardized uniform module installation space 20, 22, 24, 26 in this example, and the rearmost uniform module installation space 28 forming a shortened uniform module installation space region E.

Figure 3:
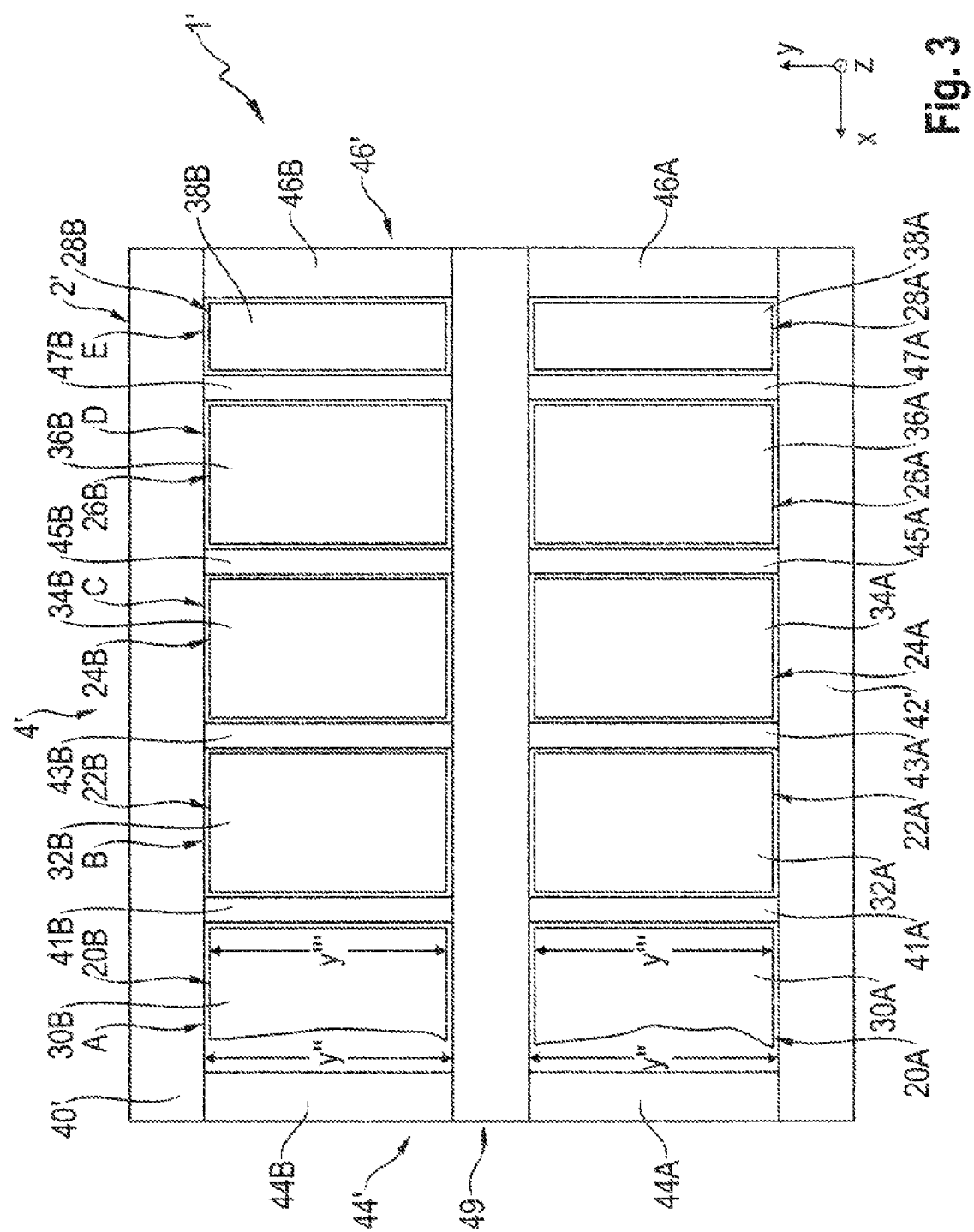
FIG. 3 shows a diagrammatic outline of a modified underfloor energy store assembly of modular construction.

FIG. 3 shows a diagrammatic outline of an underfloor energy store assembly 2', modified slightly with respect to the example from FIG. 2, of a motor vehicle 1' with a modular motor vehicle architecture according to the invention. The peripheral protective frame 4' is fundamentally constructed like the peripheral protective frame 4 of FIG. 2, and has two lateral longitudinal beams 40', 42' and a front and a rear crossmember arrangement 44', 46'. The front crossmember arrangement 44' comprises a left-hand front crossmember 44A and a right-hand front crossmember 44B which extend in each case between the associated lateral longitudinal beam 40', 42' and a middle channel 49 which runs in the longitudinal direction X of the motor vehicle 1. The channel 49 forms a central tunnel, running in the longitudinal direction, of the underfloor energy store assembly 2', in which central tunnel, for example, electric lines, fuel lines and/or at least one exhaust gas pipe penetrate/penetrates the underfloor energy store assembly 2' in the longitudinal direction. The channel 49 therefore divides the underfloor energy store assembly 2' into a left-hand half and into a right-hand half, with the result that the lower crossmember arrangement 46' is also divided into a left-hand rear crossmember 46A and a right-hand rear crossmember 46B. In a corresponding way, the inner cross members are also divided in each case into a left-hand inner crossmember 41A, 43A, 45A, 47A and a right-hand inner crossmember 41B, 43B, 45B, 47B, although at least some of the crossmembers can also be of continuous configuration, as is shown in the example of FIG. 2.

In a corresponding way, the uniform module installation space regions A, B, C, D, E are equipped in each case with a left-hand standardized uniform module installation space 20A, 22A, 24A, 26A and a right-hand standardized uniform module installation space 20B, 22B, 24B, 26B. The rearmost, shortened uniform module installation space region E is also divided by way of the channel 49 into two shortened rearmost uniform module installation spaces 28A, 28B. The respective length of the standardized uniform module installation spaces 20A, 20B, 22A, 22B, 24A, 24B, 26A, 26B corresponds to the longitudinal dimension x of the standardized uniform module installation spaces 20, 22, 24, 26 of the embodiment from FIG. 2. The length of the two rearmost uniform module installation spaces 28A, 28B also corresponds to the value ½ x, as in the example of FIG. 2. The width y" of the respective uniform module installation spaces 20A, 20B, 22A, 22B, 24A, 24B, 26A, 26B, 28A, 28B is identical on the left-hand side and on the right-hand side. Correspondingly, the width y'" of the respective energy store modules 30A, 30B, 32A, 32B, 34A, 34B, 36A, 36B is also slightly smaller than the width y" of the uniform module installation spaces. This means that a standardized energy store module 30A, 30B, 32A, 32B, 34A, 34B, 36A, 36B, the longitudinal extent x' of which in the vehicle longitudinal direction X corresponds to the longitudinal extent x' in the example of FIG. 2, is received with an accurate fit in each standardized uniform module installation space 20A, 20B, 22A, 22B, 24A, 24B, 26A, 26B. The respective rearmost, shortened uniform module installation space 28A, 28B is also configured in this example for receiving energy store peripheral units 38A, 38B.

Figure 4:
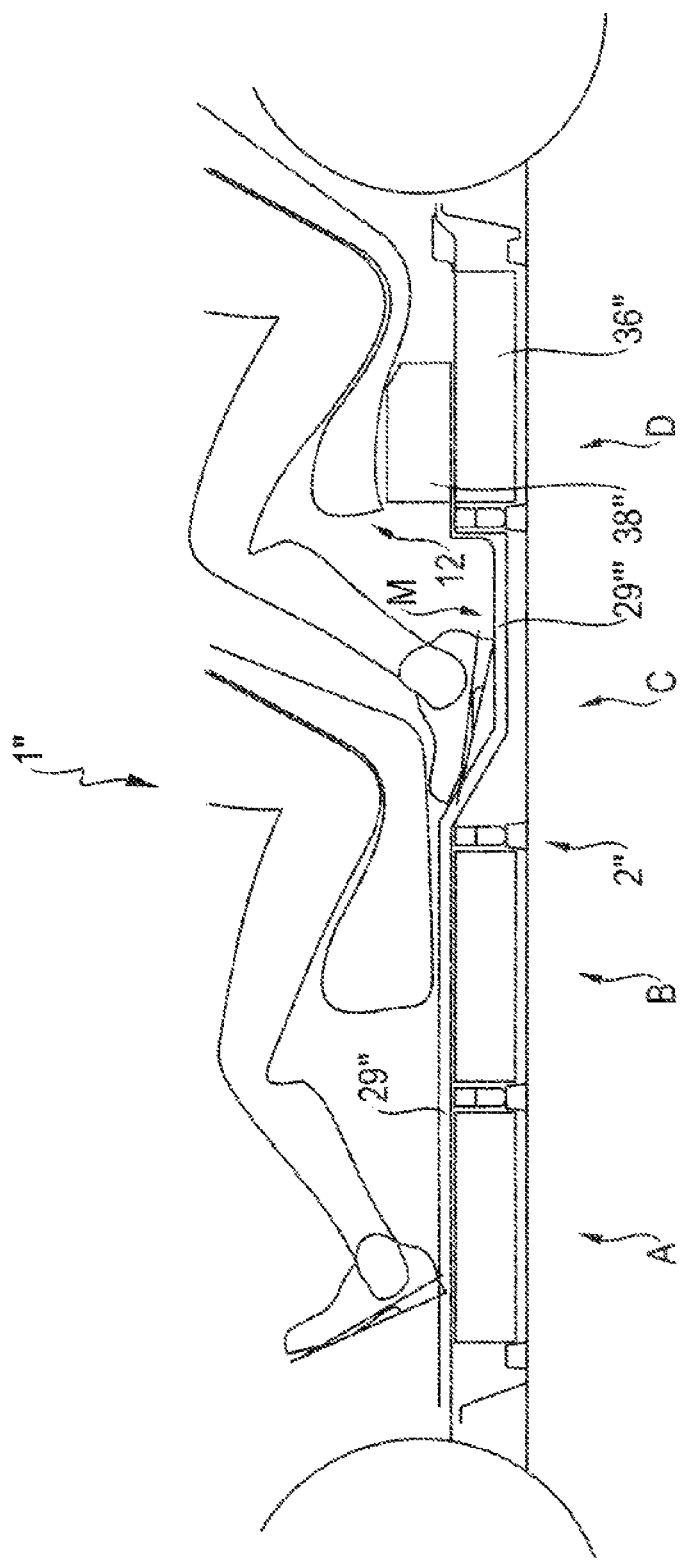
FIG. 4 shows a diagrammatic longitudinal section through a second variant of an underfloor energy store assembly of modular construction of a modular motor vehicle architecture according to the invention.

FIG. 4 shows a diagrammatic longitudinal section through a second variant of an underfloor energy store assembly 2" of modular construction of a motor vehicle 1", which underfloor energy store assembly 2" corresponds in terms of its division in the longitudinal direction to the underfloor energy store assembly 2 from FIG. 1. In the vehicle transverse direction, it can correspond both to the embodiment from FIG. 2 and to the embodiment from FIG. 3.

Here, the uniform module installation space regions A, B and D correspond to the uniform module installation space regions A, B and D of the embodiment from FIG. 1. The third uniform module installation space region C is of modified configuration in the variant of FIG. 4, however. Instead of the provision of uniform module installation spaces in the uniform module installation space region C, the covering 29" of the underfloor energy store assembly 2" is recessed here and configures a downwardly recessed interior compartment floor region 29''' between the uniform module installation space region B and the uniform module installation space region D, with the result that a footwell recess M is formed in this way in the uniform module installation space region C, in which footwell recess M passengers seated on a rear seat bench 12 of the motor vehicle 1" can place their feet.

Since the motor vehicle 1" has a shorter wheelbase than the motor vehicle 1 of the exemplary embodiment from FIG. 1, the shortened, rearmost uniform module installation space region is absent in the case of the embodiment according to FIG. 4. Therefore, in the case of this embodiment, the energy store peripheral unit 38" is provided above the energy store module 36" in the uniform module installation space region D below a rear seat 12.

Figure 5A:
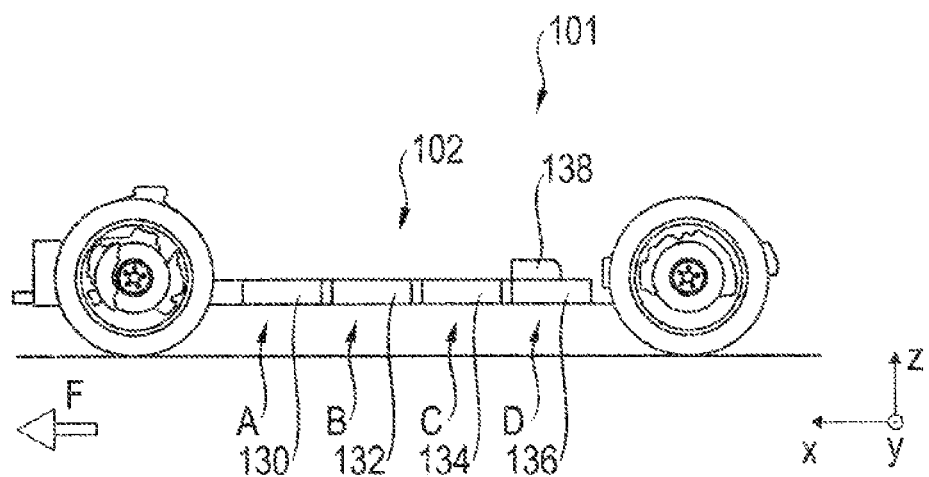
FIGS. 5A-5C show different variants of an underfloor energy store assembly of modular construction in a battery electric motor vehicle.
Figure 5B:
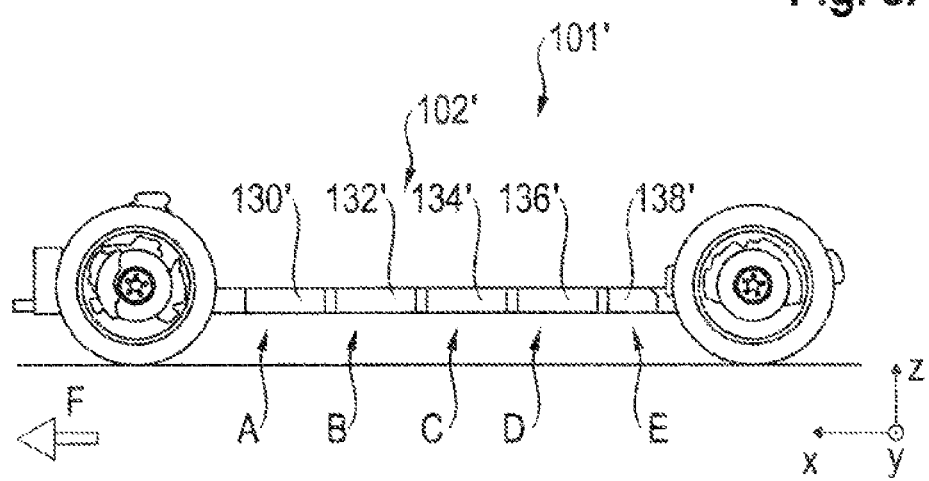
Figure 5C:
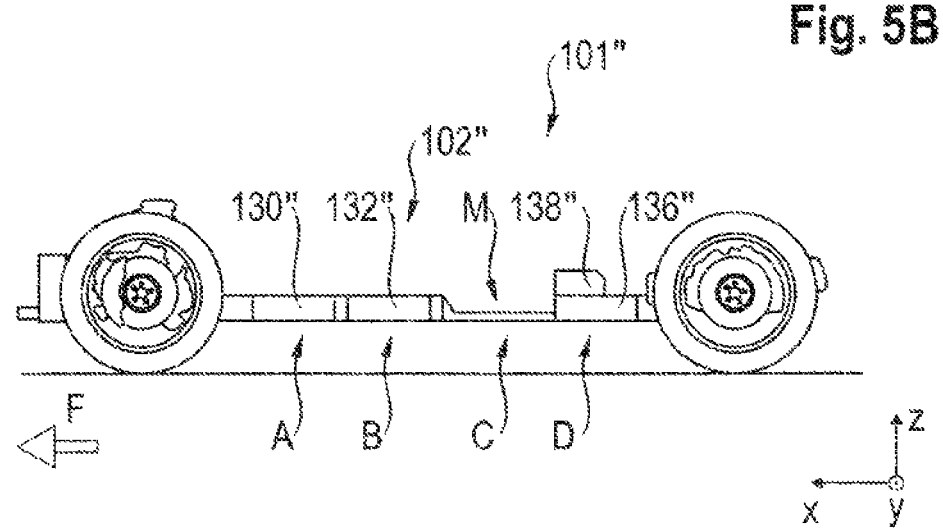

FIGS. 5A to 5C show a simplified illustration of the floor assemblies of three different motor vehicle types of a battery electric motor vehicle.

The motor vehicle 101 which is shown in FIG. 5A has a short wheelbase, and is equipped with four uniform module installation space regions A, B, C, D which are situated behind one another in the longitudinal direction and in which standardized energy store modules 130, 132, 134, 136 which are configured in each case as electric batteries are received. In the transverse direction, the underfloor energy store assembly 102 can be constructed like that of FIG. 2 or like that of FIG. 3. In the case of this vehicle 101, the energy store peripheral unit 138 with the control and/or regulating device is arranged in the fourth uniform module installation space region D above the energy store module 136 there and below a rear vehicle seat (not shown).

FIG. 5B shows a floor assembly of a motor vehicle 101' with an extended wheelbase, the underfloor energy store assembly 102' of which has five uniform module installation space regions A, B, C, D, E which are situated behind one another in the longitudinal direction, as has already been described in conjunction with FIG. 1. The standard uniform module installation space regions A, B, C, D are equipped with standard energy store modules 130', 132', 134', 136' which are likewise configured as electric batteries. An energy store peripheral unit 138 with the control and/or regulating device is provided in the rearmost, shortened uniform module installation space region, as in the example of FIG. 1.

FIG. 5C shows the floor assembly of a motor vehicle 101" with an underfloor energy store assembly 102", the motor vehicle 101" having the same short wheelbase as the motor vehicle 101 from FIG. 5a. The underfloor energy store assembly 102" in the example of FIG. 5c corresponds to the construction, as has already been described in conjunction with FIG. 4, with the result that the uniform module installation space regions A, B and D are equipped here with standard energy store modules 130", 132", 136" which are configured as electric batteries, and a footwell recess M being configured in the third standard uniform module installation space region C. The energy store peripheral unit 138" with the control and/or regulating device is also arranged here in the uniform module installation space region D above the energy store module 136" there and below a rear vehicle seat (not shown).

Figure 6A:
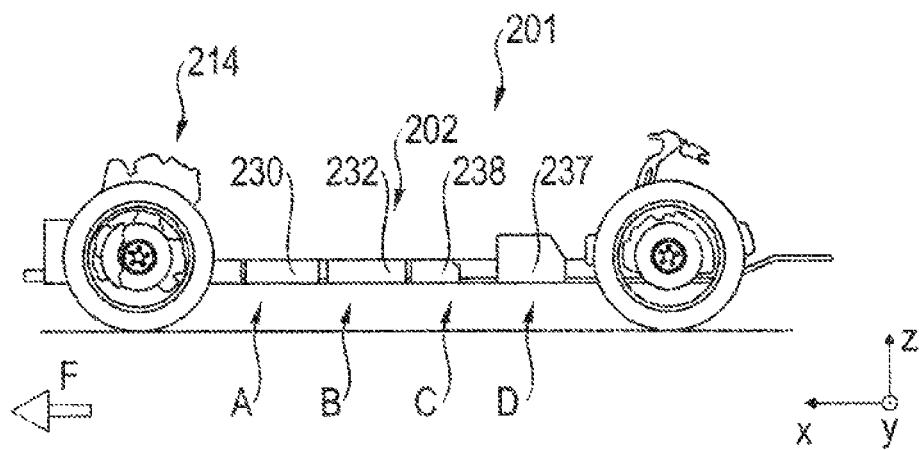
FIGS. 6A-6C show different variants of an underfloor energy store assembly of modular construction in a motor vehicle with a plug-in hybrid drive.
Figure 6B:
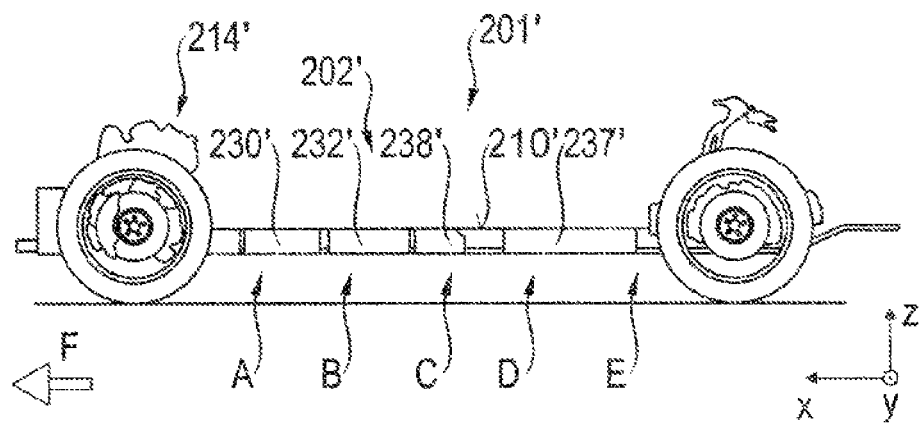
Figure 6C:
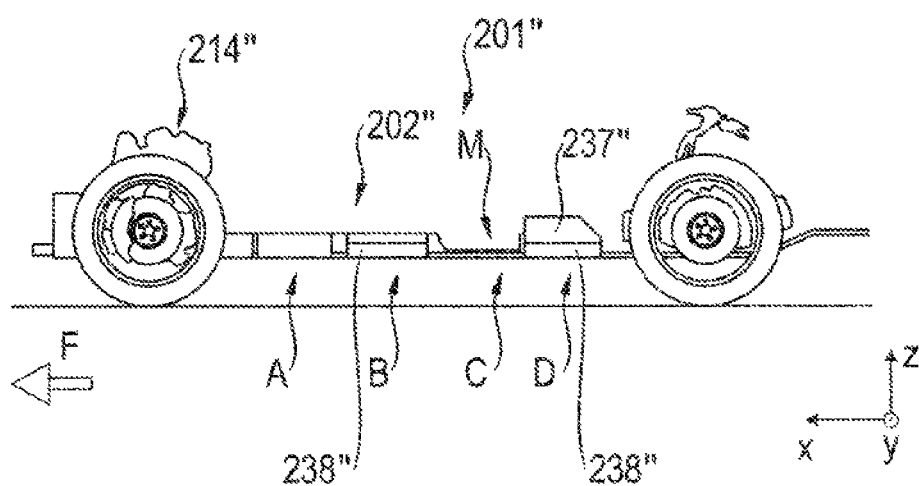

FIGS. 6A to 6C show a simplified illustration of the floor assemblies of three different motor vehicle types of a plug-in hybrid motor vehicle with an internal combustion engine and an electric motor.

Here too, the motor vehicle 201 which is shown in FIG. 6A has a short wheelbase, and the motor vehicle 201' which is shown in FIG. 6B has a longer wheelbase. The motor vehicle 201" in FIG. 6C is also provided here with a short wheelbase, and is equipped with a footwell recess M in the region of the third standard uniform module installation space region C.

In the case of the variants of FIGS. 6A and 6B, the respective underfloor energy store assembly 202, 202' is fitted in the two front standard unit module installation space regions A and B with standardized energy store modules 230, 232, 230', 232' which are configured as an electric battery, and in each case one energy store peripheral unit 238, 238' is provided in the third standard uniform module installation space region C.

In the variant of FIG. 6A with a short wheelbase, a liquid fuel tank 237 for the supply of the internal combustion engine 214 is provided in the fourth uniform module installation space region D. The fuel tank 237 extends vertically beyond the standard height of a standardized energy store module as far as below a rear vehicle seat.

In the variant of FIG. 6B with a longer wheelbase, the liquid fuel tank 237' is accommodated in the fourth uniform module installation space region D and the rearmost, shortened uniform module installation space region E, the uniform module installation spaces of which are combined to receive the liquid fuel tank 237' for the supply of the internal combustion engine 214'. Therefore, the energy store assembly 202' has a planar upper side, with the result that the motor vehicle 201' has a continuously planar interior compartment floor 210'.

The energy store assembly 202" of the variant of FIG. 6C is fundamentally constructed like the variant shown in FIG. 6a with a short wheelbase. The standardized energy store modules 230", 232" which are configured as an electric battery are provided in the two front uniform module installation space regions A and B, and the liquid fuel tank 237' for the supply of the internal combustion engine 214" (as in the example of FIG. 6A) is provided in the fourth uniform module installation space region D. The energy store peripheral unit 238" is accommodated either in a uniform module installation space in the second uniform module installation space region B or in the fourth uniform module installation space region D.

Figure 7A:
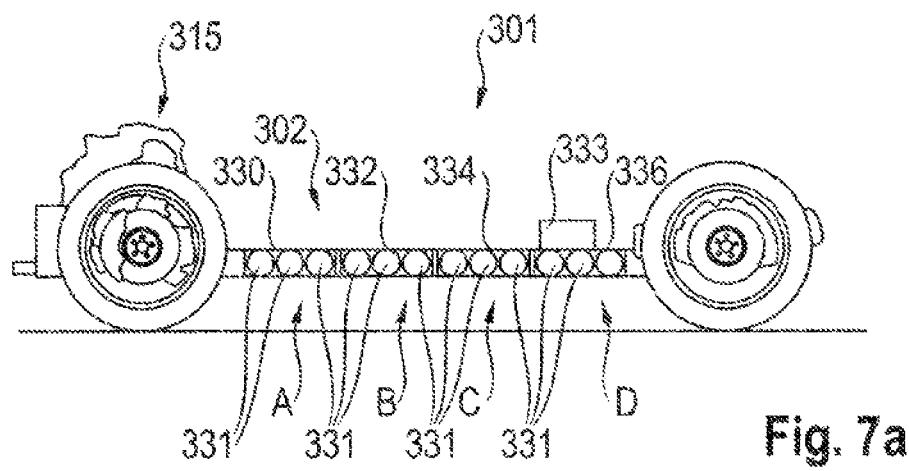
FIGS. 7A-7C show different variants of an underfloor energy store assembly of modular construction in a fuel cell motor vehicle.
Figure 7B:
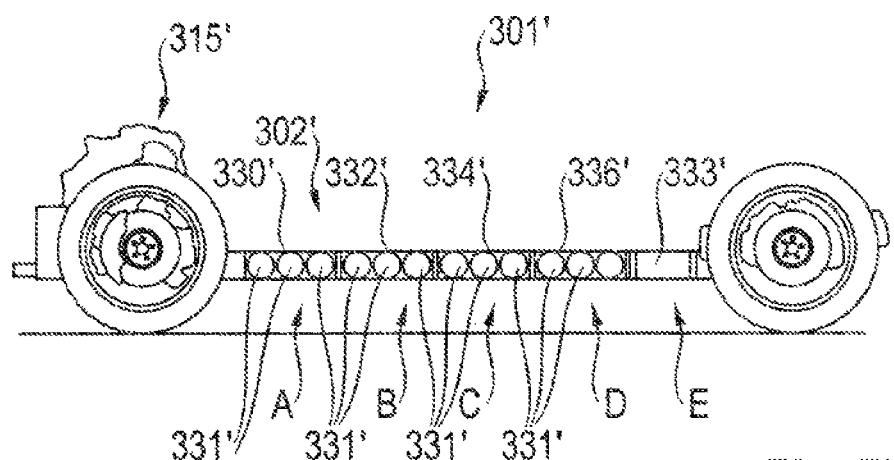
Figure 7C:
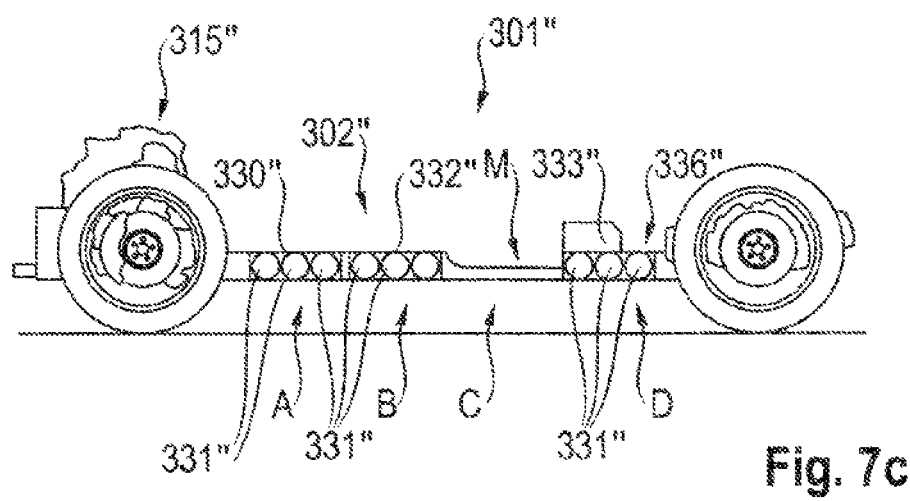

FIGS. 7A to 7C show a simplified illustration of the floor assemblies of three different vehicle types of fuel cell motor vehicle 301, 301', 301".

Here, the motor vehicle which is shown in FIG. 7A likewise has the short wheelbase, and the motor vehicle which is shown in FIG. 7B has the longer wheelbase. The motor vehicle in FIG. 7C is also configured here with a short wheelbase, and is equipped with a footwell recess M in the region of the third standard uniform module installation space region C.

In the case of all three variants, pressure tanks 331, 331', 331" for a gaseous fuel for the supply of the fuel cell 315, 215', 315" are received in corresponding standardized energy store modules 330, 232, 336, 330', 332', 336', 330", 332", 236" in the uniform module installation spaces of the respective underfloor energy store assembly 302, 302', 302" in the uniform module installation space regions A, B and D. Whereas the third standard uniform module installation space region C is provided with a footwell recess M in the case of the third variant of FIG. 7C, standardized energy store modules 334, 334' which are likewise fitted with pressure tanks 331, 331' for the gaseous fuel are provided in the case of the two first variants of FIGS. 7A and 7B in the uniform module installation spaces of the third standard uniform module installation space region C. In addition to the pressure tanks 331, 331', 331", an energy store module 333, 333', 333" which is configured as an electric battery is provided in each of the three variants, which energy store module 333, 333', 333" is arranged below a rear vehicle seat in the fourth uniform module installation space region D in the case of the variants with a short wheelbase (FIGS. 7A and 7B) and is arranged in the shortened, rearmost uniform module installation space region E in the case of the variant shown in FIG. 7B with a long wheelbase.

The invention is not restricted to the above exemplary embodiments which merely serve for general explanation of the core concept of the invention. Within the context of the scope of protection, the apparatus according to the invention can rather also assume different embodiment forms than those described above. Here, in particular, the apparatus can have features which represent a combination of the respective individual features of the claims.

Designations in the claims, the description and the drawings serve merely for improved comprehension of the invention, and are not intended to restrict the scope of protection. For improved clarity of the claims, not all designations of all embodiments are recorded in the superordinate claims, which does not represent a restriction of the superordinate claims, however.

| List of Designations | |
|---|---|
| 1 | Motor vehicle |
| 1' | Motor vehicle |
| 1" | Motor vehicle |
| 2 | Underfloor energy store assembly |
| 2' | Underfloor energy store assembly |
| 2" | Underfloor energy store assembly |
| 4 | Protective frame |
| 4' | Protective frame |
| 10 | Interior compartment floor |
| 12 | Rear seat |
| 20 | Uniform module installation space |
| 20A | Uniform module installation space |
| 20B | Uniform module installation space |
| 22 | Uniform module installation space |
| 22A | Uniform module installation space |
| 22B | Uniform module installation space |
| 24 | Uniform module installation space |
| 24A | Uniform module installation space |
| 24B | Uniform module installation space |
| 26 | Uniform module installation space |
| 26A | Uniform module installation space |
| 26B | Uniform module installation space |
| 28 | Uniform module installation space |
| 28A | Uniform module installation space |
| 28B | Uniform module installation space |
| 29 | Covering of the underfloor energy store assembly |
| 29' | Lower floor |
| 29" | Covering of the underfloor energy store assembly |
| 29''' | Recessed interior compartment floor region |
| 30 | Energy store module |
| 30A | Energy store module |
| 30B | Energy store module |
| 32 | Energy store module |
| 32A | Energy store module |
| 32B | Energy store module |
| 34 | Energy store module |
| 34A | Energy store module |
| 34B | Energy store module |
| 36 | Energy store module |
| 36" | Energy store module |

-continued

List of Designations

| | |
|---|---|
| 36A | Energy store module |
| 36B | Energy store module |
| 38 | Energy store peripheral unit |
| 38'' | Energy store peripheral unit |
| 38A | Energy store peripheral unit |
| 38B | Energy store peripheral unit |
| 39 | Control and/or regulating device |
| 40 | Right-hand lateral longitudinal beam |
| 41 | Inner crossmember |
| 41A | Left-hand inner crossmember |
| 41B | Right-hand inner crossmember |
| 42 | Left-hand lateral longitudinal beam |
| 43 | Inner crossmember |
| 43A | Left-hand inner crossmember |
| 43B | Right-hand inner crossmember |
| 44 | Front crossmember arrangement |
| 44' | Front crossmember arrangement |
| 44A | Left-hand front crossmember |
| 44B | Right-hand front crossmember |
| 45 | Inner crossmember |
| 45A | Left-hand inner crossmember |
| 45B | Right-hand inner crossmember |
| 46 | Rear crossmember arrangement |
| 46' | Rear crossmember arrangement |
| 46A | Left-hand rear crossmember |
| 46B | Right-hand rear crossmember |
| 47 | Inner crossmember |
| 47A | Left-hand inner crossmember |
| 47B | Right-hand inner crossmember |
| 49 | Channel |
| 101 | Motor vehicle |
| 101' | Motor vehicle |
| 101'' | Motor vehicle |
| 102 | Underfloor energy store assembly |
| 102' | Underfloor energy store assembly |
| 102'' | Underfloor energy store assembly |
| 130 | Energy store module |
| 130' | Energy store module |
| 130'' | Energy store module |
| 132 | Energy store module |
| 132' | Energy store module |
| 132'' | Energy store module |
| 134 | Energy store module |
| 134' | Energy store module |
| 136 | Energy store module |
| 136' | Energy store module |
| 136'' | Energy store module |
| 138 | Energy store peripheral standard |
| 138' | Energy store peripheral standard |
| 138'' | Energy store peripheral standard |
| 201 | Motor vehicle |
| 201' | Motor vehicle |
| 201'' | Motor vehicle |
| 202 | Underfloor energy store assembly |
| 202' | Underfloor energy store assembly |
| 202'' | Underfloor energy store assembly |
| 210' | Interior compartment floor |
| 214 | Internal combustion engine |
| 214' | Internal combustion engine |
| 230 | Energy store module |
| 230' | Energy store module |
| 230'' | Energy store module |
| 232 | Energy store module |
| 232' | Energy store module |
| 232'' | Energy store module |
| 237 | Liquid fuel tank |
| 237' | Liquid fuel tank |
| 237'' | Liquid fuel tank |
| 238 | Energy store peripheral standard |
| 238' | Energy store peripheral standard |
| 238'' | Energy store peripheral standard |
| 301 | Motor vehicle |
| 301' | Motor vehicle |
| 301'' | Motor vehicle |
| 302 | Underfloor energy store assembly |
| 302' | Underfloor energy store assembly |
| 302'' | Underfloor energy store assembly |

-continued

List of Designations

| | |
|---|---|
| 315 | Fuel cell |
| 315' | Fuel cell |
| 330 | Energy store module |
| 330' | Energy store module |
| 330'' | Energy store module |
| 331 | Pressure tank |
| 331' | Pressure tank |
| 331'' | Pressure tank |
| 332 | Energy store module |
| 332' | Energy store module |
| 332'' | Energy store module |
| 333 | Energy store module |
| 333' | Energy store module |
| 333'' | Energy store module |
| 336 | Energy store module |
| 336' | Energy store module |
| 336'' | Energy store module |
| A | Uniform module installation region |
| B | Uniform module installation region |
| C | Uniform module installation region |
| D | Uniform module installation region |
| E | Uniform module installation region |
| M | Footwell recess |
| x | Longitudinal dimension of a uniform module installation |
| x' | Longitudinal dimension |
| X | Longitudinal direction |
| Y | Transverse direction |
| y | Width of a uniform module installation region |
| y'' | Width of a uniform module installation region |
| y''' | Width of a uniform module installation region |

The invention claimed is:

1. A modular motor vehicle architecture for motor vehicles of different motor vehicle types with, in each case, at least one drive unit and at least one energy store assigned to the at least one drive unit, comprising:
   a modular designed underfloor energy store assembly that has a plurality of energy store modules which are standardized in terms of at least one external dimension, the at least one energy store being received in the underfloor energy store assembly, wherein
   each motor vehicle type is assigned one underfloor energy store assembly from a plurality of standardized underfloor energy store assemblies, and
   each underfloor energy store assembly has a plurality of uniform module installation spaces which are standardized in terms of a longitudinal dimension which runs in a longitudinal direction of the motor vehicle, and which are configured to receive, in each case, at least one standardized energy store module;
   wherein the underfloor energy store assembly has a further uniform module installation space region with at least one shortened uniform module installation space, the longitudinal dimension, running in the longitudinal direction of the motor vehicle, of the further uniform module installation space region and the longitudinal dimension, running in the longitudinal direction of the motor vehicle, of the shortened uniform module installation space being shorter than those of a regular standardized uniform module installation space region and a regular standardized uniform module installation space, respectively.

2. The modular motor vehicle architecture according to claim 1, wherein
   a plurality of standardized uniform module installation space regions which lie behind one another are provided in the underfloor energy store assembly in the longitudinal direction of the motor vehicle.

3. The modular motor vehicle architecture according to claim 2, wherein
the longitudinal dimension, running in the longitudinal direction of the motor vehicle, of each standardized uniform module installation space region corresponds to the longitudinal dimension of the standardized uniform module installation space.

4. The modular motor vehicle architecture according to claim 2, wherein
a middle channel extending in the longitudinal direction of the motor vehicle is provided which divides the respective uniform module installation space region into a left-hand and a right-hand uniform module installation space.

5. The modular motor vehicle architecture according to claim 1, wherein
at least one energy store module is formed by at least one electric battery module or has at least one electric battery module.

6. The modular motor vehicle architecture according to claim 5, wherein
at least one energy store peripheral unit is provided, which is configured for being received in a uniform module installation space, and has electric control and/or regulating devices for the at least one of electric battery module.

7. The modular motor vehicle architecture according to claim 1, wherein
at least one energy store module is formed by at least one liquid fuel tank or has at least one liquid fuel tank.

8. The modular motor vehicle architecture according to claim 7, wherein
at least one energy store peripheral unit is provided, which is configured for being received in a uniform module installation space, and has control and/or regulating devices for liquid fuel.

9. The modular motor vehicle architecture according to claim 1, wherein
at least one energy store module is formed by at least one pressure tank for a gaseous fuel or has at least one pressure tank.

10. The modular motor vehicle architecture according to claim 9, wherein
at least one energy store peripheral unit is provided, which is configured for being received in a uniform module installation space, and has control and/or regulating devices for gaseous fuel.

11. A motor vehicle comprising a modular motor vehicle architecture with a modular underfloor energy store assembly according to claim 1.

12. A motor vehicle comprising a modular motor vehicle architecture with a modular underfloor energy store assembly according to claim 2, wherein
the modular underfloor energy store assembly has three or more uniform module installation space regions in the longitudinal direction of the motor vehicle.

13. A motor vehicle comprising:
a modular motor vehicle architecture with a modular underfloor energy store assembly comprising a plurality of energy store modules which are standardized in terms of at least one external dimension, at least one energy store being received in the underfloor energy store assembly, wherein:
each motor vehicle type of the modular motor vehicle architecture is assigned one underfloor energy store assembly from a plurality of standardized underfloor energy store assemblies,
each underfloor energy store assembly has a plurality of uniform module installation spaces which are standardized in terms of a longitudinal dimension which runs in a longitudinal direction of the motor vehicle, and which are configured to receive, in each case, at least one standardized energy store module,
at least one energy store module is formed by at least one pressure tank for a gaseous fuel or has at least one pressure tank, and,
at least one uniform module installation space is configured as a footwell recess in at least one of the uniform module installation space regions.

* * * * *